United States Patent [19]

Ichihara

[11] Patent Number: 4,528,756
[45] Date of Patent: Jul. 16, 1985

[54] SYSTEM FOR DETECTING CAMBER OF ROLLED MATERIAL

[75] Inventor: Junichi Ichihara, Hyogo, Japan

[73] Assignee: Mitsubishi Denki Kabushiki Kaisha, Tokyo, Japan

[21] Appl. No.: 532,475

[22] Filed: Sep. 15, 1983

[51] Int. Cl.³ .............. G01B 7/04; G01B 7/28; B21B 37/00
[52] U.S. Cl. .................. 33/503; 33/142; 33/147 L; 33/557; 72/12; 72/17; 73/159
[58] Field of Search .......... 72/17, 12, 11, 10, 9, 72/8, 20, 21; 73/159; 364/472; 33/141 B, 141 E, 141.5, 142, 147 L, 147 N, 148 H, 149 J, 174 L, 141 G

[56] References Cited

U.S. PATENT DOCUMENTS

| | | | |
|---|---|---|---|
| 2,289,410 | 7/1942 | Dahlstrom | 72/17 |
| 2,885,787 | 5/1959 | Gray et al. | 33/141 B X |
| 3,425,249 | 2/1969 | O'Brien | 72/17 X |
| 3,656,239 | 4/1972 | Hutchinson et al. | 33/174 L X |
| 3,882,606 | 5/1975 | Kaenel et al. | 33/142 X |
| 3,892,043 | 7/1975 | Bonikowski | 33/149 J X |

*Primary Examiner*—Francis S. Husar
*Assistant Examiner*—Steven B. Katz
*Attorney, Agent, or Firm*—Bernard, Rothwell & Brown

[57] ABSTRACT

A system for detecting the camber of a rolled material by detecting the right and left outlet side lengths of the rolled material per unit time on the outlet side of a rolling mill and also detecting the plate width of the rolled material and then subjecting the detected signals to an arithmetic processing by an arithmetic unit to calculate the radius of curvature of the plate center line of the rolled material.

4 Claims, 7 Drawing Figures

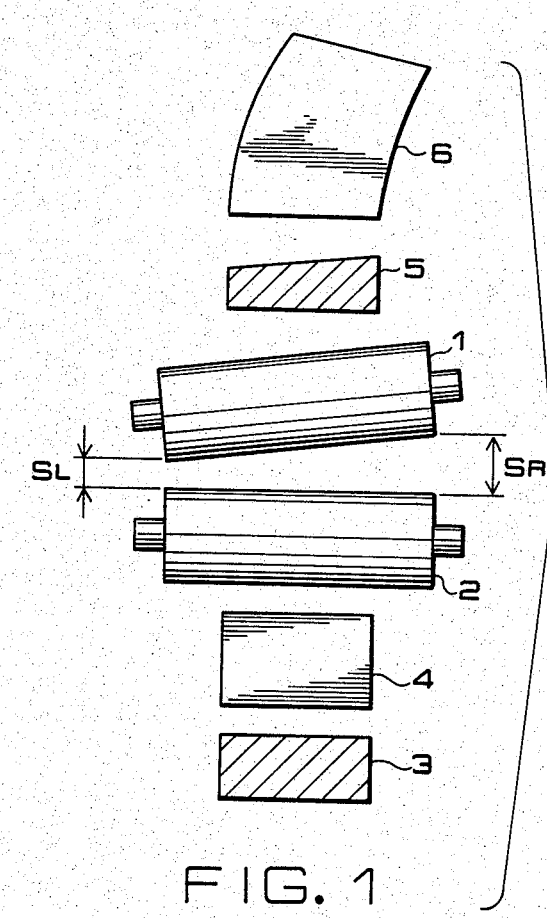
FIG. 1
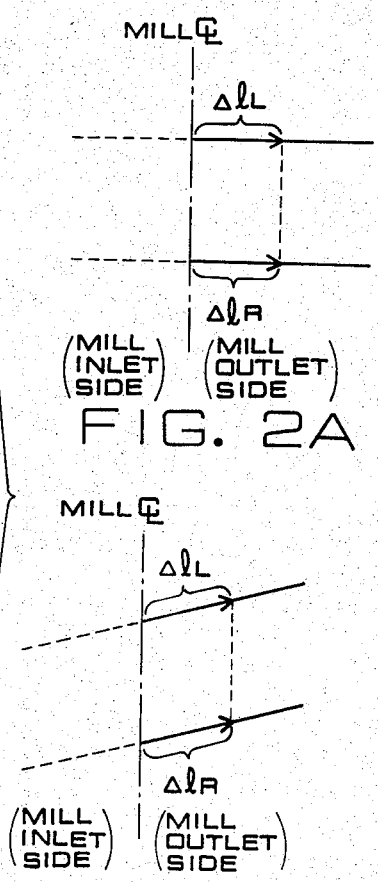
FIG. 2A
FIG. 2B
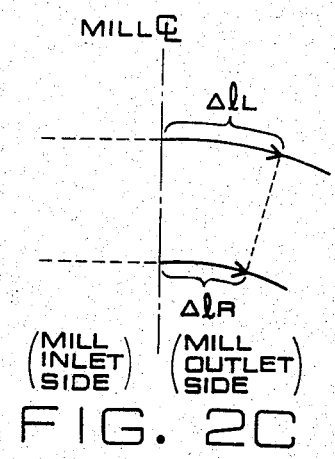
FIG. 2C

SYSTEM FOR DETECTING CAMBER OF ROLLED MATERIAL

BACKGROUND OF THE INVENTION

1. Field of the Invention

The present invention relates to a system for detecting the camber of a material rolled by a rolling mill during rolling operation.

2. Description of the Prior Art

Generally, the camber of a rolled material means a curved plane shape (lateral bend) of the rolled material occurring during rolling. Such camber exerts a bad influence upon the plate width accuracy and the rectangularization of a plane shape, thus impeding the improvement of the yield rate and of quality. This camber is caused by a non-uniformity in elongation between the right and left sides in the width direction of a rolled material. More particularly, it is caused mainly by the following factors:

(1) Difference in reduction opening between the right and left sides of a rolling mill;
(2) Non-uniformity in diameter between the right and left sides of a rolling roll (local wear and local heat);
(3) Difference in mill rigidity between the right and left sides;
(4) Non-uniformity in temperature in the width direction of a rolled material (one-sided cooling and unevenness in temperature);
(5) Off-center rolling; and
(6) Wedging of a rolled material on the rolling mill inlet side.

Referring to FIG. 1, there is shown a typical example of occurrence of the camber, in which the reference numerals 1 and 2 denote upper and lower rolls, respectively, of a rolling mill; $S_R$ and $S_L$ denote reduction openings on the right and left sides, respectively, of the rolling mill; the numeral 3 denotes the section of a material to be rolled on the inlet side of the rolling mill; the numeral 4 denotes a plane of the material to be rolled; the numeral 5 denotes the section of the material after rolling on the outlet side of the rolling mill; and the numeral 6 denotes a plane of the rolled material. As is apparent from the figure, the right-hand reduction opening $S_R$ is set larger than the left-hand reduction opening $S_L$, so that the rolled material undergoes a larger elongation on its left side than on its right side in the position just under the rolling mill, and it is curved to the right on the outlet side of the rolling mill.

Heretofore, such camber of a rolled material has been detected qualitatively by the operator, or quantitatively by using a gauge on an off-line after termination of the rolling operation. Thus, it has heretofore been impossible to quantitatively detect the occurrence of the camber on-line during the rolling operation, and therefore it has been difficult to control the operation of the rolling mill for preventing the occurrence of the camber.

SUMMARY OF THE INVENTION

The present invention has been accomplished for eliminating the above-mentioned drawbacks of the conventional system. It is an object of the present invention to provide a system for detecting the camber of a rolled material, capable of detecting quantitatively on-line the camber which occurs momentarily during rolling.

Other objects and advantages of the present invention will become apparent from the following detailed description of an embodiment taken in connection with the accompanying drawings.

BRIEF DESCRIPTION OF THE DRAWINGS

FIG. 1 is a schematic view illustrative of the camber;

FIGS. 2A to 2C and FIG. 3 are schematic views illustrative of the principle of the present invention;

DESCRIPTION OF THE PREFERRED EMBODIMENT

The principle of the present invention will first be described. As previously noted, the camber is caused by a non-uniformity in elongation between the right and left sides in the width direction of a rolled material in the position just under a rolling mill. And the final degree of bend of the camber is determined by the difference in length between the right and left side portions of the rolled material on the outlet side from the position just under the rolling mill measured per unit time. This is as shown in FIGS. 2A to 2C, of which FIGS. 2A and 2B are illustrative of the case where the right and left side lengths $\Delta l_R$ and $\Delta l_L$ of the rolled material per unit time on the outlet side of the rolling mill are equal to each other; in this case, the camber does not occur. FIG. 2C is illustrative of the case where $\Delta l_L$ is larger than $\Delta l_R$; in this case, the rolled material curves in the right-hand direction. Between the right and left outlet side lengths of the rolled material per unit time from just under the rolling mill and the radius of curvature of the camber there exists the following relationship:

$$\Delta l_L = \left(\rho + \frac{W}{2}\right) \cdot \theta \tag{1}$$

$$\Delta l_R = \left(\rho - \frac{W}{2}\right) \cdot \theta \tag{2}$$

$$\therefore \rho = \frac{\Delta l_L + \Delta l_R}{\Delta l_L - \Delta l_R} \cdot \frac{W}{2} \tag{3}$$

wherein
W: plate width
$\theta$: arc angle
$\rho$: radius of curvature of plate center line
O: center of curvature It is here defined that when the symbol $\rho$ indicative of the radius of curvature is positive, the center of curvature is located on the right side of the plate center line, and when it is negative, the center of curvature is located on the left side of the plate center line. Further, the reciprocal of the radius of curvature $\rho$, i.e. $1/\rho$, represents curvature, so if $\Delta l_L$, $\Delta l_R$ and W can be calculated from the above equation (3), there are obtained both the radius of curvature and curvature.

Figure 5:
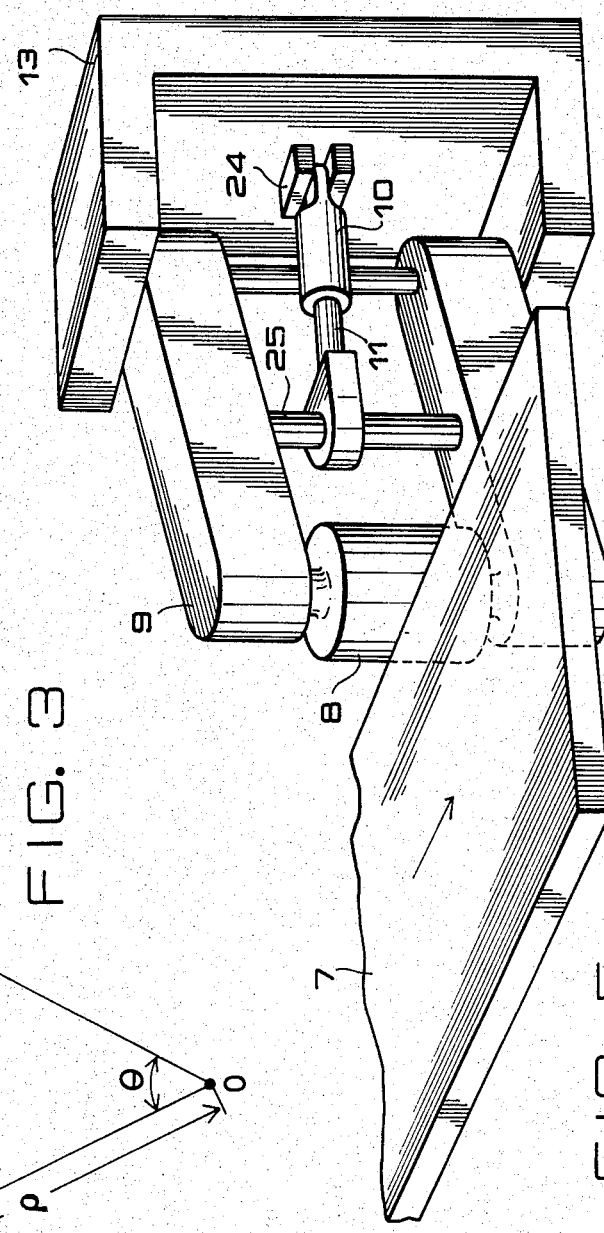
FIG. 5 is a perspective view of principal components of the system of FIG. 4.
Figure 3:
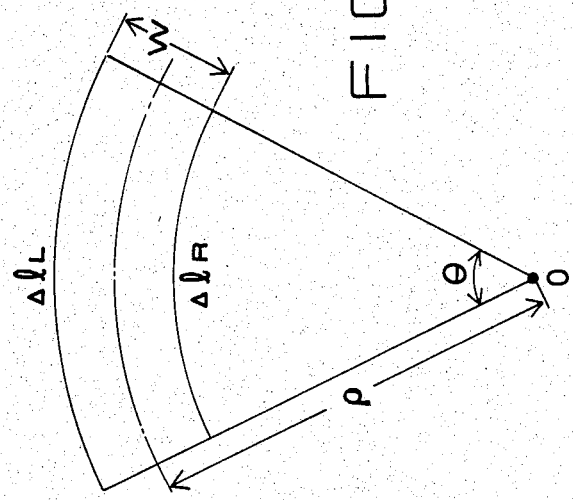
Figure 4:
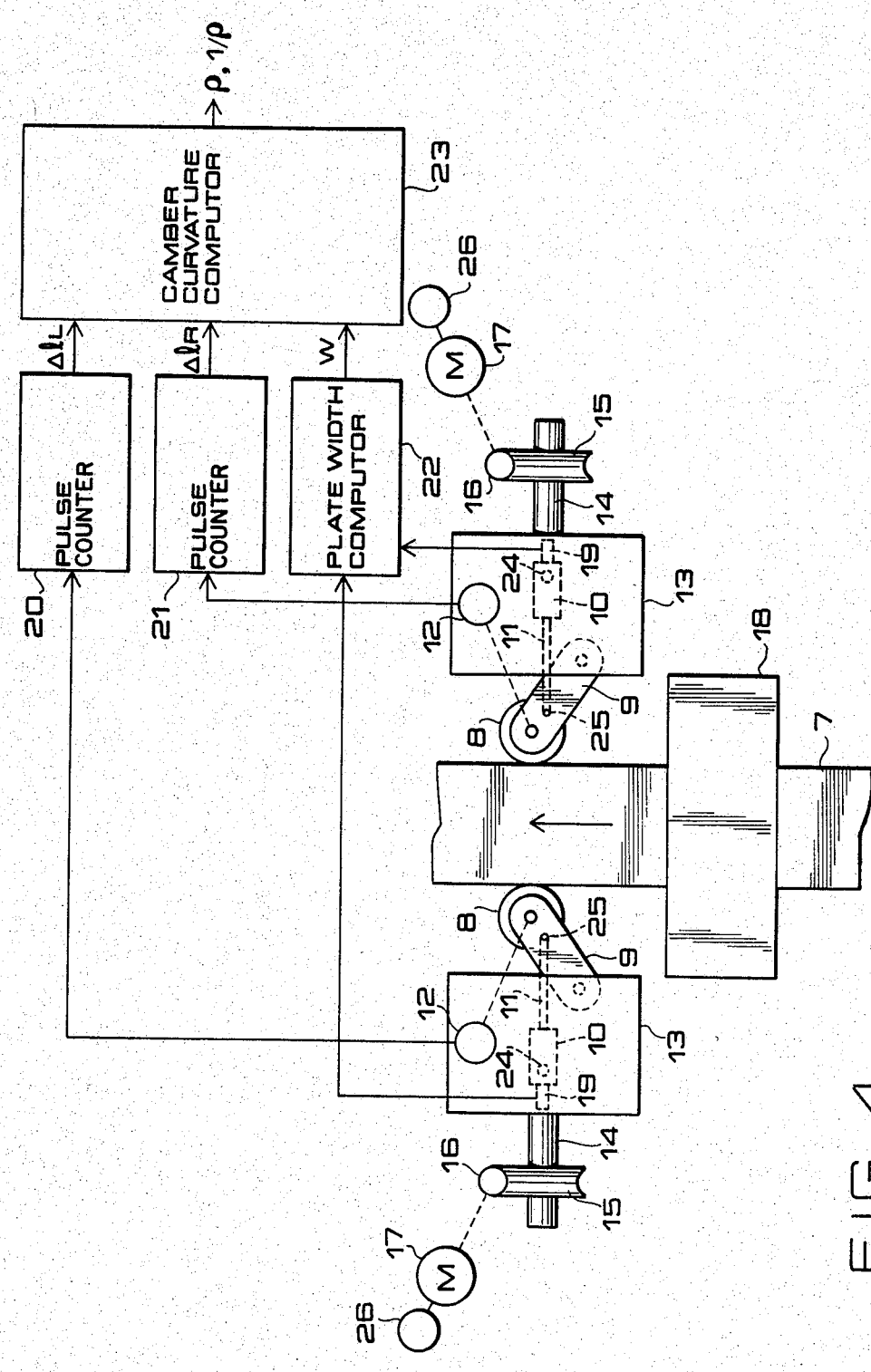
FIG. 4 is a block diagram of a camber detecting system according to embodiment of the present invention.

Referring now to FIGS. 4 and 5, there is illustrated an embodiment of the present invention, in which the numeral 18 denotes a rolling mill; the numeral 7 denotes a material rolled by the rolling mill; and numeral 8 denotes a touch roller, two touch rollers 8 being provided for synchronous rotation in contact with the right and left side portions of the rolled material 7 on the outlet side of the rolling mill 18. The members as will be described hereinafter each with a single reference numeral in association with the touch rollers 8 are also each provided as right and left members. The numeral 9 denotes an arm which supports the touch roller 8, the arm 9 being attached to a movable block 13 through a fixed pin 25. Further through the fixed pin 25 the arm 9 is connected to a piston rod 11 and a pressure cylinder 10. By means of the pressure cylinder 10 the touch rollers 8 are adapted to be urged to both the right and left side portions of the rolled material 7. The pressure cylinder 10 is supported by a bracket 24 which is fixed to the movable block 13. The numeral 12 denotes a pulse generator adapted to rotate in synchronism with the touch roller 8, and the numeral 19 denotes a cylinder position detector for detecting the stroke of the pressure cylinder 10. The movable block 13 is adapted to be driven by an opening setting motor 17 through a rod 14, a worm wheel 15 and a worm 16 and thereby moved forward and backward in the direction orthogonal to the rolling line. The numeral 26 denotes a pulse generator, which is connected to the motor 17 and which functions to detect the position of the movable block 13. The numerals 20 and 21 denote pulse counters for counting the output pulses of the pulse generators 12, the pulse counters 20 and 21 being adapted to rotate in synchronism with touch rollers 8. From the number of pulses per unit time the pulse counters 20 and 21 output left and right outlet side lengths $\Delta l_L$ and $\Delta l_R$, respectively, of the rolled material. The numeral 22 denotes a plate width computing (detecting) device for computing the degree of opening (plate width) of the touch rollers 8 from the position of the movable block 13 and also from the stroke position of the pressure cylinder 10. The numeral 23 denotes a camber curvature computer for computing the camber curvature on the basis of the outputs $\Delta l_L$, $\Delta l_R$ and W of the pulse counters 20, 21 and the computer 22 and in accordance with the foregoing equation (3).

The movable block 13 is subjected to an automatic positioning control (APC) by the opening setting motor 17 with a certain allowance beforehand in accordance with a desired plate width. When the fore end of the rolled material 7 reaches the camber detecting system, the touch rollers 8 are brought into pressure contact with both side portions of the rolled material 7 by means of the pressure cylinders 10. To the pressure cylinders 10 are normally applied a pressure sufficient to urge the touch rollers against both side portions of the rolled material 7 and to permit those rollers to be rotated in synchronism with the rolled material 7.

An example of the method of obtaining the camber curvature by using this camber detecting system will now be given. It is here assumed that the touch roller 8 is 150 mm in diameter, that the pulse generator 12 connected to the touch roller 8 is adapted to produce 3,600 pulses per revolution and that the pulse counters 20 and 21 count the number of pulses with a period of 100 msec. Further the number of the pulses transmitted by pulse counters 20, 21 within the measuring time of 100 msec. can be calculated by the following equation when the rotation speed of the roll of the rolling mill is 360 mpm and the advancing rate at normal condition is 1.0363.

$$\frac{\left(360 \text{ mpm} \times 1.0363 \times \frac{1000}{60}\right) \text{(mm/sec)} \times 0.1 \text{ (sec)} \times 3600}{\pi \times 150} = 4750$$

For example, when the number counted by the pulse counter 20 is 4750, the number counted by the pulse counter 21 is 4735 and the width of the strip is . 2,000 mm, then the radius of the curvature $\rho$ is determined as follows from the foregoing equation (3), the curvature being the reciprocal of $\rho$:

$$\rho = \frac{4750 + 4735}{4750 - 4735} \cdot \frac{2000}{2} = 632,333 \text{ (mm)}$$

According to the present invention, there is provided a system for detecting the camber of a rolled material of such a construction as described hereinabove, whereby the camber curvature in the rolled material can be detected with a high accuracy.

What is claimed is:

1. A system for detecting the camber of a rolled material, comprising:
   (a) touch rollers disposed on both right and left sides of the rolled material on the outlet side of a rolling mill;
   (b) cylinder mechanisms connected to said touch rollers for urging said touch rollers against the right and left side portions of the rolled material;
   (c) means associated with said cylinder mechanisms for detecting the cylinder positions of said cylinder mechanisms;
   (d) means dependent on the cylinder positions detected by said detecting means for detecting the plate width of the rolled material from the cylinder positions;
   (e) pulse generators connected to said touch rollers to rotate in synchronism with said touch rollers;
   (f) counters connected to said pulse generators for counting the number of pulses provided from said pulse
   (g) means connected to said counters and to said plate width detecting means for computing the curvature or radius of curvature of the camber of the rolled material occurring on the outlet side of the rolling mill on the basis of the difference in number between the pulses produced by one of said pulse generators and the pulses produced by the other pulse generator at every predetermined time period and the plate width detected by said plate width detecting means.

2. A camber detecting system according to claim 1, wherein each of said cylinder mechanisms is mounted on a movable block, said blocks being movable in response to movement of said touch rollers, said cylinder mechanisms being mounted on said movable blocks for movement therewith, and further including plate width computing means for computing the spacing of said touch rollers from the cylinder positions detected by said cylinder position detecting means.

3. A camber detecting system according to claim 1 wherein said means for computing radius of curvature of the camber of the rolled material computes the radius of curvature on the basis of the formula $$\rho = \frac{\Delta l_L + \Delta l_R}{\Delta l_L - \Delta l_R} \cdot \frac{W}{2}.$$

4. A camber detecting system according to claim 2 wherein said means for computing radius of curvature of the camber of the rolled material computes the radius of curvature on the basis of the formula $$\rho = \frac{\Delta l_L + \Delta l_R}{\Delta l_L - \Delta l_R} \cdot \frac{W}{2}.$$

* * * * *

UNITED STATES PATENT AND TRADEMARK OFFICE
CERTIFICATE OF CORRECTION

PATENT NO. : 4,528,756
DATED : July 16, 1985
INVENTOR(S) : Junichi Ichihara

It is certified that error appears in the above-identified patent and that said Letters Patent is hereby corrected as shown below:

On the front page of the patent, left column, insert the following:

-- [30]   Foreign Application Priority Data

Jan. 11, 1983   [JP]   Japan       58-2970 --

Column 2, line 53, "$p$indicative" should read
--$p$ indicative--.

Signed and Sealed this

Twenty-sixth Day of November 1985

[SEAL]

Attest:

DONALD J. QUIGG

Attesting Officer

Commissioner of Patents and Trademarks